United States Patent
Xu et al.

(10) Patent No.: US 9,977,300 B2
(45) Date of Patent: May 22, 2018

(54) ARRAY SUBSTRATE AND DISPLAY DEVICE

(71) Applicant: Boe Technology Group Co., Ltd., Beijing (CN)

(72) Inventors: Jian Xu, Beijing (CN); Pan Li, Beijing (CN); Xingchen Shangguan, Beijing (CN); Yong Hu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days. days.

(21) Appl. No.: 15/037,755

(22) PCT Filed: Sep. 29, 2015

(86) PCT No.: PCT/CN2015/091055
§ 371 (c)(1),
(2) Date: May 19, 2016

(87) PCT Pub. No.: WO2016/201824
PCT Pub. Date: Dec. 22, 2016

(65) Prior Publication Data
US 2017/0176824 A1   Jun. 22, 2017

(30) Foreign Application Priority Data
Jun. 15, 2015   (CN) .................... 2015 2 0411574 U

(51) Int. Cl.
*G02F 1/1362* (2006.01)
*G02F 1/1368* (2006.01)
*G09G 3/36* (2006.01)

(52) U.S. Cl.
CPC ...... *G02F 1/136204* (2013.01); *G02F 1/1368* (2013.01); *G02F 1/136286* (2013.01);
(Continued)

(58) Field of Classification Search
CPC ............ G02F 1/136204; G02F 1/1368; G02F 1/136286; G09G 2330/04; G09G 2320/0257; G09G 3/3677; G09G 3/36
See application file for complete search history.

(56) References Cited

U.S. PATENT DOCUMENTS

2006/0145951 A1 *  7/2006  Watanabe ......... G02F 1/136204
                                                                345/55
2008/0218652 A1    9/2008  Kim et al.
(Continued)

FOREIGN PATENT DOCUMENTS

CN      101192379      6/2006
CN      104297969      1/2015
(Continued)

OTHER PUBLICATIONS

International Search Report and Written Opinion from PCT/CN2015/091065 dated Mar. 22, 2016.

*Primary Examiner* — Abhishek Sarma
(74) *Attorney, Agent, or Firm* — Calfee, Halter & Griswood LLP

(57) ABSTRACT

The disclosure provides an array substrate and a display device. The array substrate comprises a plurality of gate lines and a gate driving circuit for providing scan signals to the plurality of gate lines successively. The array substrate further comprises a discharge signal line for releasing electric charges and a discharge circuit arranged between the discharge signal line and the plurality of gate lines. The discharge circuit is used for enabling the plurality of gate lines to be electrically connected with the discharge signal line when the gate driving circuit turns off.

14 Claims, 2 Drawing Sheets

(52) U.S. Cl.
CPC .............. *G09G 3/36* (2013.01); *G09G 3/3677* (2013.01); *G09G 2320/0257* (2013.01); *G09G 2330/04* (2013.01)

(56) References Cited

U.S. PATENT DOCUMENTS

2011/0292005 A1* 12/2011 Lau ...................... G09G 3/3677
    345/204
2014/0232964 A1    8/2014 Tseng et al.
2015/0206477 A1* 7/2015 Xu ........................ G09G 3/3233
    345/206
2015/0348487 A1* 12/2015 Zheng .................. G09G 3/3611
    345/213

FOREIGN PATENT DOCUMENTS

CN    204667021    9/2015
TW    200823831    6/2008

* cited by examiner

A-A

ARRAY SUBSTRATE AND DISPLAY DEVICE

RELATED APPLICATIONS

The present application is the U.S. national phase entry of PCT/CN2015/091055, with an international filing date of Sep. 29, 2015, which claims the benefit of Chinese Patent Application No. 201520411574.8, filed Jun. 15, 2015, the entire disclosures of which are incorporated herein by reference.

FIELD

The disclosure relates to the field of display technology, particularly to an array substrate and a display device comprising the array substrate.

BACKGROUND

Liquid crystal display devices have been widely applied in electronic devices such as mobile phones, televisions, and notebook PCs due to characteristics of low radiation, small thickness, and other benefits. In a liquid crystal display device, a display panel is divided into a plurality of pixel units by a plurality of gate lines and a plurality of data lines, with each pixel unit provided with a thin film transistor. When a driving circuit drives the display panel, a scan signal is supplied to gate lines successively, thereby turning on thin film transistors in a row of pixel units to which the scanned gate line correspond, so as to enable voltage signals on data lines to be supplied on pixel electrodes of pixel units through the thin film transistors which are turned on.

However, when the driving circuit turns off, the thin film transistors in the pixel units generally do not turn off simultaneously, thereby resulting in certain residual images on the display panel.

SUMMARY

The following disclosure is related to an array substrate and a display device comprising the array substrate which reduces residual images that come up when the driving circuit turns off.

The disclosure provides an array substrate, comprising a plurality of gate lines and a gate driving circuit for providing scan signals to the plurality of gate lines successively, wherein the array substrate further comprises a discharge signal line for releasing electric charges and a discharge circuit arranged between the discharge signal line and the plurality of gate lines. The discharge circuit is used for enabling the plurality of gate lines to be electrically connected with the discharge signal line when the gate driving circuit turns off.

In some embodiments, the discharge circuit comprises a control line and a plurality of first thin film transistors in one-to-one correspondence with the plurality of gate lines. A gate of each first thin film transistor is connected with the control line, a first pole of each first thin film transistor is connected with a corresponding gate line, and a second pole of each first thin film transistor is connected with the discharge signal line.

In some embodiments, the discharge circuit further comprises a plurality of transmission portions arranged in a same layer as second poles of the plurality of first thin film transistors. One end of each transmission portion forms an overlapping area with the discharge signal line. A via hole is arranged in the overlapping area, the one end of each transmission portion is connected with the discharge signal line through the via hole, and the other end of each transmission portion is connected with a second pole of at least one thin film transistor in the plurality of first thin film transistors.

In some embodiments, the discharge circuit is arranged in a non-display area of the array substrate, an insulating layer is arranged between a gate and a first pole and a second pole of each first thin film transistor, the gate of each first thin film transistor forms an integrated structure with the control line, the first pole of each first thin film transistor forms an integrated structure with a corresponding gate line.

In some embodiments, each transmission portion is connected with a second pole of one thin film transistor in the plurality of first thin film transistors.

In some embodiments, each transmission portion is connected with both of second poles of two adjacent thin film transistors in the plurality of first thin film transistors.

In some embodiments, the array substrate further comprises a plurality of electrostatic prevention portions in one-to-one correspondence with the plurality of gate lines respectively, each electrostatic prevention portion is connected between a corresponding gate line and the discharge signal line, so as to release electrostatic on the corresponding gate line to the discharge signal line.

In some embodiments, each electrostatic prevention portion comprises a second thin film transistor and a third thin film transistor, gates and first poles of the second thin film transistor and the third thin film transistor are all connected with a corresponding gate line, second poles of the second thin film transistor and the third thin film transistor are both connected with the discharge signal line. The second thin film transistor can be an N-type thin film transistor, and the third thin film transistor can be a P-type thin film transistor.

Correspondingly, the disclosure further provides a display device comprising the above array substrate provided by the disclosure.

In the disclosure, a discharge circuit is arranged on the array substrate. When the gate driving circuit turns off and no scan signal is outputted, the discharge circuit can electrically connect the gate line with the discharge signal line, thereby releasing residual electric charges on the gate line to the discharge signal line. Therefore, the thin film transistors in respective pixel units are turned off, so that occurrence of residual images is reduced and image display quality of the display device is improved. Moreover, an electrostatic prevention portion can also be arranged on the array substrate. The electrostatic prevention portion can release the electrostatic on the gate line. The electrostatic prevention portion and the discharge circuit can share one discharge signal line, thereby simplifying the structure of the array substrate as much as possible while realizing discharge and electrostatic prevention of the gate line.

BRIEF DESCRIPTION OF THE DRAWINGS

The drawings are used for providing further understanding to the disclosure, and constitute a part of the specification. The drawings are used only for explaining the disclosure along with the following specific embodiments. However, they do not constitute limitations to the disclosure.

DETAILED DESCRIPTION

Next, specific embodiments of the disclosure will be explained in detail with reference to the drawings. It should be understood that the specific embodiments described here are only used for explaining and interpreting the disclosure rather than limiting the disclosure.

The following reference signs will be used throughout the specification and accompanying figures:

1. gate line; 2. gate driving circuit; 3. discharge circuit; 31. first thin film transistor; 311. first pole of the first thin film transistor; 312. second pole of the second thin film transistor; 313. gate of the first thin film transistor; 314. insulating layer; 315. active layer; 32. control line; 33. discharge signal line; out: output terminal of the discharge signal line; 34. transmission portion; 35. via hole; 36. conductive material layer; 4. electrostatic prevention portion; 42. second thin film transistor; 43. third thin film transistor; 5. base substrate.

Figure 1:
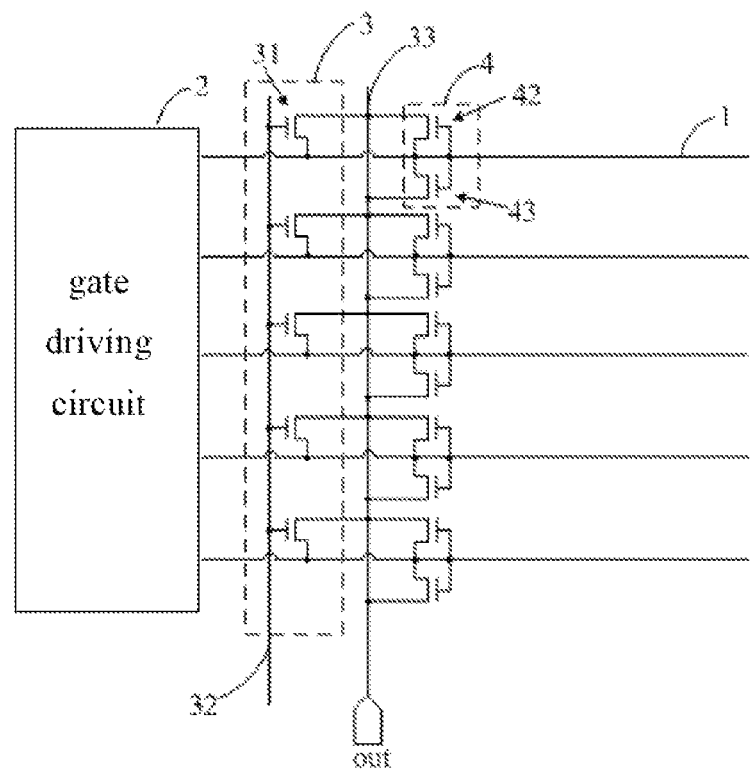
FIG. 1 is a schematic view of an equivalent circuit of an array substrate in an embodiment of the disclosure.

In one aspect of the disclosure, an array substrate is provided. As shown in FIG. 1, the array substrate comprises a plurality of gate lines 1 and a gate driving circuit 2 for providing scan signals to the plurality of gate lines 1 successively. The array substrate further comprises a discharge signal line 33 for releasing electric charges and a discharge circuit 3 arranged between the discharge signal line 33 and the plurality of gate lines 1. The discharge circuit 3 is used for enabling the plurality of gate lines 1 to be electrically connected with the discharge signal line 33 when the gate driving circuit 2 turns off.

When the array substrate is used for displaying images, the gate driving circuit provides a scan signal to each gate line successively. When the gate driving circuit turns off, the gate driving circuit has no signal output, and does not need to perform image display.

In an embodiment of the disclosure, the output terminal "out" of the discharge signal line 33 can be connected with structures such as the common electrode, the grounding line etc., so as to enable the discharge signal line, after receiving large amount of electric charges, to direct them into the circuit loop of the entire display panel to achieve the aim of releasing the electric charges.

In an embodiment of the disclosure, a discharge circuit is arranged. When the gate driving circuit turns off, the discharge circuit enables a plurality of gate lines to be electrically connected with the discharge signal line 33, so as to release the electric charges on the plurality of gate lines to the discharge signal line 33, such that the thin film transistors in respective pixel units connected with the gate lines turn off. Therefore, generation of residual images is reduced and display quality is improved.

In order to prevent the discharge circuit from affecting image display, the discharge circuit 3 and the discharge signal line 33 are arranged in the non-display area of the array substrate.

As a specific embodiment of the disclosure, as shown in FIG. 1 to FIG. 4, the discharge circuit 3 comprises a control line 32 and a plurality of first thin film transistors 31 in one-to-one correspondence with the plurality of gate lines respectively. A gate of each first thin film transistor 31 is connected with the control line 32. Further, a first pole of each first thin film transistor 31 is connected with a corresponding gate line 1 and a second pole of each first thin film transistor 31 is connected with the discharge signal line 33, so as to control the plurality of first thin film transistors. It can be understood that the control line 32 and the plurality of gate lines 1 are insulated and crossed. In the event that the display panel does not display images, i.e., when the gate driving circuit turns off, a turn-on level can be supplied to the control line 32, so as to enable the first pole and the second pole of each first thin film transistor to be in on state, thereby releasing the residual electric charges on each gate line 1 to the loop of the display panel through the discharge signal line 33.

In a display device comprising the above array substrate, a control circuit can be further comprised. The control circuit can output a control signal for controlling the gate driving circuit 2 to turn on or turn off. The control circuit can be connected with the discharge circuit 3, so as to output a turn-off level to the control line while outputting a control signal for controlling the gate driving circuit 2 to turn on and output a turn-on level to the control line while outputting a control signal for controlling the gate driving circuit 2 to turn off. Therefore, the discharge circuit 3 does not discharge the gate lines when the gate driving circuit scans the gate lines to display an entire frame of image. When it is not required to display images and the gate driving circuit 2 is turned off, the discharge circuit 3 electrically connects the gate lines with the discharge signal line 33 so as to perform discharge.

Figure 2:
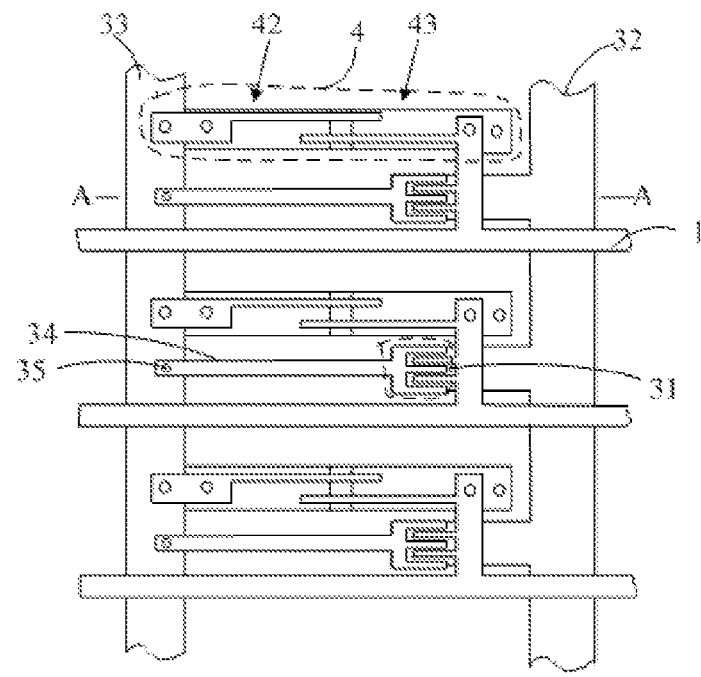
FIG. 2 is a structural schematic view of an array substrate in an embodiment of the disclosure.
Figure 3:
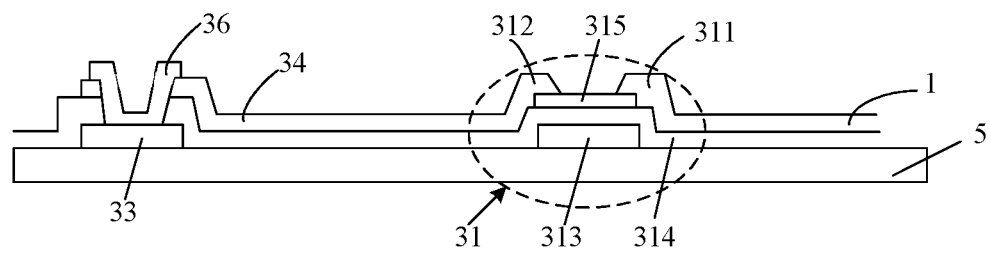
FIG. 3 is a sectional view along line A-A in FIG. 2.

As shown in FIG. 2 and FIG. 3, the discharge signal line 33 and gates 313 of a plurality of first thin film transistors 31 are arranged in a same layer. The discharge circuit 3 further comprises a plurality of transmission portions 34 arranged in a same layer as second poles 312 of the plurality of first thin film transistors, and one end of each transmission portion 34 forms an overlapping area with the discharge signal line 33. A via hole 35 is arranged in the overlapping area. The one end of each transmission portion 34 is connected with the discharge signal line 33 through the via hole 35, and the other end of each transmission portion 34 is connected with a second pole 312 of at least one thin film transistor in the plurality of first thin film transistors. When a turn-on voltage is applied on the control line, the electric charges on the gate lines 1 are released to the discharge signal line 33 through the first thin film transistors 31 and the transmission portions 34.

Specifically, as shown in FIG. 3, an insulating layer 314 is arranged between a gate 313 and a first pole 311 and a second pole 312 of each first thin film transistor 31. The insulating layer 314 for example can cover the whole non-display area. The gate 313 of each first thin film transistor 31 forms an integrated structure with the control line, and the first pole 311 of each first thin film transistor 31 forms an integrated structure with a corresponding gate line 1. The insulating layer 314 insulates and spaces apart the control line 32 and the plurality of gate lines 1. As shown in FIG. 3, in the overlapping area formed by the transmission portion 34 and the discharge signal line 33, the via hole runs through the transmission portion 34 and the insulating layer 314. A conductive material layer 36 such as a transparent electrode (e.g. ITO) can be arranged to connect the transmission portion 34 with the discharge signal line 33. Forming an integrated structure mentioned above means being arranged in a same layer and being connected with each other. In the manufacturing process of the array substrate, a metal layer can be formed on a part of a base substrate 5 corresponding to the non-display area, and a pattern comprising the control line 32 and the gate 313 can be formed through the patterning process. Then the insulating layer 314 is formed, and the insulating layer 314 for example can cover the whole non-display area or the whole base substrate 5. Next, a pattern comprising an active layer 315 is formed above the insulating layer. Finally a pattern comprising the second pole 312 and the connected first pole 311 and gate lines 1 is formed.

Specifically, as shown in FIG. 2, the number of the transmission portions 34 can be same as the number of the first thin film transistors, i.e., each first thin film transistor 31 corresponds to one transmission portion 34, and each transmission portion 34 is connected with a second pole of one thin film transistor 31. One end of each transmission portion 34 is connected with the discharge signal line 33 through the via hole 35, and the other end is connected with a second pole of a corresponding first thin film transistor.

Figure 4:
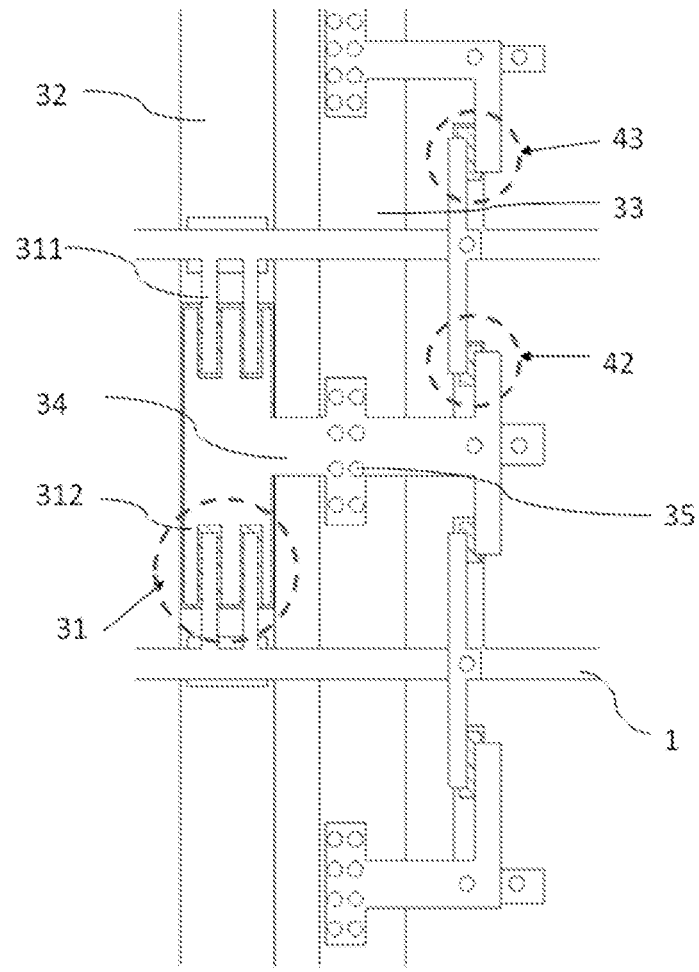
FIG. 4 is a structural schematic view of an array substrate in another embodiment of the disclosure.

In order to simplify the structure of the discharge circuit, as shown in FIG. 4, the number of the transmission portions 34 can be half of the number of the first thin film transistors 31, i.e., each transmission portion 34 is connected with both of second poles 312 of two adjacent first thin film transistors 31.

In order to reduce electrostatic generated on the gate lines during use of the array substrate, as shown in FIG. 1, FIG. 2 and FIG. 4, the array substrate further comprises a plurality of electrostatic prevention portions 4 in one-to-one correspondence with the plurality of gate lines respectively. Each electrostatic prevention portion 4 is connected between a corresponding gate line 1 and the discharge signal line 33, so as to release the electrostatic on the corresponding gate line 1 to the discharge signal line 33. In addition, the discharge circuit 3 and the electrostatic prevention portions 4 can share the same discharge signal line 33, which simplifies the structure of the array substrate.

Specifically, as shown in FIG. 1, each electrostatic prevention portion 4 comprises a second thin film transistor 42 and a third thin film transistor 43. Gates and first poles of the second thin film transistor 42 and the third thin film transistor 43 are all connected with a corresponding gate line 1. Second poles of the second thin film transistor 42 and the third thin film transistor 43 are both connected with the discharge signal line 33. The second thin film transistor 42 can be an N-type thin film transistor, and the third thin film transistor 43 can be a P-type thin film transistor. When relatively high electrostatic is generated on the gate line 1 and the electrostatic is of positive polarity, the second thin film transistor 42 is turned on, thereby releasing the electrostatic through the discharge signal line 33 to the circuit loop of the display panel connected with the discharge signal line. When electrostatic of negative polarity is generated on the gate line 1 and the absolute value is relatively large, the third thin film transistor 43 is turned on, thereby releasing the electrostatic through the discharge signal line 33 to the circuit loop of the display panel connected with the discharge signal line.

As the other aspect of the disclosure, a display device is provided, which can comprise the above array substrate.

From the above depiction on the array substrate and the display device provided by the disclosure it can be seen that a discharge circuit is arranged on the array substrate. When the gate driving circuit turns off and no scan signal is outputted, the discharge circuit can electrically connect the gate line with the discharge signal line. Since the discharge signal line can be connected with the grounding line and the common electrode etc., the residual electric charges on the gate line can be released to the circuit loop of the display panel connected with the discharge signal line, thereby enabling the thin film transistors in respective pixel units to turn off, so as to reduce occurrence of residual images and improve image display quality of the display device. Moreover, an electrostatic prevention portion can also be arranged on the array substrate. The electrostatic prevention portion can release the electrostatic on the gate line. The electrostatic prevention portion and the discharge circuit can share one discharge signal line, thereby simplifying the structure of the array substrate as much as possible while realizing discharge and electrostatic prevention of the gate line.

It can be understood that the above embodiments are only exemplary embodiments for explaining the principle of the disclosure. However, the disclosure is not limited to this. The ordinary skilled person in the art can make various modifications and improvements without departing from the spirit and the essence of the disclosure. These modifications and improvements are also encompassed in the protection scope of the disclosure.

The invention claimed is:

1. An array substrate, comprising a plurality of gate lines and a gate driving circuit for providing scan signals to the plurality of gate lines successively, wherein the array substrate further comprises a discharge signal line for releasing electric charges and a discharge circuit arranged between the discharge signal line and the plurality of gate lines, and wherein the discharge circuit is configured to reduce occurrence of residual images when the gate driving circuit turns off, wherein the discharge circuit comprises a control line and a plurality of first thin film transistors in one-to-one correspondence with the plurality of gate lines, wherein a gate of each first thin film transistor is connected with the control line, wherein a first pole of each first thin film transistor is connected with a corresponding gate line, and wherein a second pole of each first thin film transistor is connected with the discharge signal line, and wherein the discharge circuit further comprises a plurality of transmission portions arranged in a same layer as second poles of the plurality of first thin film transistors, wherein one end of each transmission portion forms an overlapping area with the discharge signal line, wherein a via hole is arranged in the overlapping area, wherein the one end of each transmission portion is connected with the discharge signal line through the via hole, and wherein the other end of each transmission portion is connected with a second pole of at least one thin film transistor in the plurality of first thin film transistors.

2. The array substrate according to claim 1, wherein the discharge circuit is arranged in a non-display area of the array substrate, wherein an insulating layer is arranged between a gate and a first pole and a second pole of each first thin film transistor, wherein the gate of each first thin film transistor forms an integrated structure with the control line, and wherein the first pole of each first thin film transistor forms an integrated structure with a corresponding gate line.

3. The array substrate according to claim 1, wherein each transmission portion is connected with a second pole of one thin film transistor in the plurality of first thin film transistors.

4. The array substrate according to claim 1, wherein each transmission portion is connected with both of second poles of two adjacent thin film transistors in the plurality of first thin film transistors.

5. The array substrate according to claim 1, wherein the array substrate further comprises a plurality of electrostatic prevention portions in one-to-one correspondence with the plurality of gate lines respectively, and wherein each electrostatic prevention portion is connected between a corresponding gate line and the discharge signal line, so as to release electrostatic on the corresponding gate line to the discharge signal line.

6. The array substrate according to claim 5, wherein each electrostatic prevention portion comprises a second thin film transistor and a third thin film transistor, wherein gates and first poles of the second thin film transistor and the third thin film transistor are all connected with a corresponding gate line, and wherein second poles of the second thin film transistor and the third thin film transistor are both connected with the discharge signal line.

7. The array substrate according to claim 6, wherein the second thin film transistor is an N-type thin film transistor, and wherein the third thin film transistor is a P-type thin film transistor.

8. A display device, comprising an array substrate according to claim 1.

9. The display device according to claim 8, wherein the discharge circuit is arranged in a non-display area of the array substrate, wherein an insulating layer is arranged between a gate and a first pole and a second pole of each first thin film transistor, wherein the gate of each first thin film transistor forms an integrated structure with the control line, and wherein the first pole of each first thin film transistor forms an integrated structure with a corresponding gate line.

10. The display device according to claim 8, wherein each transmission portion is connected with a second pole of one thin film transistor in the plurality of first thin film transistors.

11. The display device according to claim 8, wherein each transmission portion is connected with both of second poles of two adjacent thin film transistors in the plurality of first thin film transistors.

12. The display device according to claim 8, wherein the array substrate further comprises a plurality of electrostatic prevention portions in one-to-one correspondence with the plurality of gate lines respectively, and wherein each electrostatic prevention portion is connected between a corresponding gate line and the discharge signal line so as to release electrostatic on the corresponding gate line to the discharge signal line.

13. The display device according to claim 12, wherein each electrostatic prevention portion comprises a second thin film transistor and a third thin film transistor, wherein gates and first poles of the second thin film transistor and the third thin film transistor are all connected with a corresponding gate line, and wherein second poles of the second thin film transistor and the third thin film transistor are both connected with the discharge signal line.

14. The display device according to claim 13, wherein the second thin film transistor is an N-type thin film transistor, and wherein the third thin film transistor is a P-type thin film transistor.

\* \* \* \* \*